US012397465B2

(12) United States Patent
Aichele

(10) Patent No.: US 12,397,465 B2
(45) Date of Patent: Aug. 26, 2025

(54) ROTARY CUTTING DEVICE AND METHOD FOR OPERATING A ROTARY CUTTING DEVICE

(71) Applicant: Aichele Werkzeuge GmbH, Crailsheim (DE)

(72) Inventor: Wilhelm Aichele, Crailsheim (DE)

(73) Assignee: Aichele Werkzeuge GmbH, Crailsheiw (DE)

(*) Notice: Subject to any disclaimer, the term of this patent is extended or adjusted under 35 U.S.C. 154(b) by 513 days.

(21) Appl. No.: 16/949,885

(22) Filed: Nov. 19, 2020

(65) Prior Publication Data

US 2021/0078194 A1 Mar. 18, 2021

Related U.S. Application Data

(63) Continuation of application No. PCT/EP2019/063319, filed on May 23, 2019.

(30) Foreign Application Priority Data

May 23, 2018 (DE) ..................... 10 2018 112 310.8

(51) Int. Cl.
*B26D 7/26* (2006.01)

(52) U.S. Cl.
CPC .................................. *B26D 7/265* (2013.01)

(58) Field of Classification Search
CPC ..................................................... B26D 7/265
See application file for complete search history.

(56) References Cited

U.S. PATENT DOCUMENTS 5,001,950 A * 3/1991 Fokos .................... B26D 7/265 83/37
2004/0003699 A1 1/2004 Welch
2005/0229762 A1* 10/2005 Flaherty ............... B23D 35/007 83/508.3
2006/0257193 A1* 11/2006 Aichele .................. B26D 7/265 400/621
2008/0237386 A1 10/2008 Aichele
(Continued)

FOREIGN PATENT DOCUMENTS

CA 1150620 7/1973
DE 2912458 10/1980
(Continued)

*Primary Examiner* — Liang Dong
(74) *Attorney, Agent, or Firm* — Lipsitz & McAllister, LLC

(57) ABSTRACT

A rotary cutting device is provided, which comprises a first and a second roller mounted rotatably on a machine stand. Either the first roller is a tool roller and the second roller is a counter-roller, or the second roller is a tool roller and the first roller is a counter-roller. The second roller is mounted on the machine stand to be displaceable on a first displacement axis. A cutting pressure device is provided by way of which a cutting pressure can be exerted between the second roller and the first roller. In a support mode, the second roller is supported against a wedge device. The wedge device has at least one displaceable wedge element. A position of the at least one displaceable wedge element predetermines a spacing between the second roller and the first roller. A drive device enables movement of the at least one displaceable wedge element.

35 Claims, 7 Drawing Sheets

(56) References Cited

U.S. PATENT DOCUMENTS

| | | | | |
|---|---|---|---|---|
| 2015/0090089 | A1* | 4/2015 | Horii | B26D 7/265<br>83/344 |
| 2016/0279820 | A1 | 9/2016 | Boutron | |

FOREIGN PATENT DOCUMENTS

| | | |
|---|---|---|
| DE | 29715037 | 11/1997 |
| DE | 102004050443 | 5/2006 |
| DE | 102005022604 | 11/2006 |
| DE | 102007016451 | 10/2008 |
| DE | 102013110510 | 3/2015 |
| EP | 1721712 | 11/2006 |
| GB | 2045144 | 10/1980 |

* cited by examiner

ROTARY CUTTING DEVICE AND METHOD FOR OPERATING A ROTARY CUTTING DEVICE

This application is a continuation of international application number PCT/EP2019/063319 filed on 23 May 2019 and claims the benefit of German application number 10 2018 112 310.8 filed on 23 May 2018, which are incorporated herein by reference in their entirety and for all purposes.

BACKGROUND OF THE INVENTION

The invention relates to a rotary cutting device, comprising a machine stand, a first roller that is mounted rotatably on the machine stand, a second roller that is mounted rotatably on the machine stand, wherein either (i) the first roller is a tool roller and the second roller is a counter-roller, or (ii) the second roller is a tool roller and the first roller is a counter-roller, and wherein the second roller is mounted on the machine stand such that it is displaceable on a first displacement axis, and a cutting pressure device by way of which a cutting pressure is configured to be exerted between the second roller and the first roller.

Further, the invention relates to a method for operating a rotary cutting device, in which, during a machining operation, a first roller is supported against a second roller, and a material web is guided between the first roller and the second roller, wherein (i) the first roller is a tool roller and the second roller is a counter-roller, or (ii) the second roller is a tool roller and the first roller is a counter-roller, and wherein the second roller is displaceable in relation to the first roller on a first displacement axis.

DE 297 15 037 U1 discloses a rotary punching machine or an impression apparatus, which has a roller and a counter-pressure cylinder that is arranged to form an intermediate space parallel to the roller and at a small spacing therefrom, wherein the roller and the counter-pressure cylinder are mounted rotatably and are coupled by means of a transmission for the purpose of simultaneous rotation, and where there can be introduced into the intermediate space a material web out of which workpieces can be fully or partly punched or pressed during rotation of the roller. Conical rolls in mutual abutment can be mounted on the axes for the roller and the counter-pressure cylinder. At least one of the axes is displaceable both axially and radially in relation to the other axis.

DE 10 2004 050 443 A1 discloses a device for punching, having as the punching cylinder a first cylinder, which is rotatable about a punching cylinder axis of rotation, and having as the counter-cylinder a second cylinder, which is rotatable about a counter-cylinder axis of rotation that runs axially parallel to the punching cylinder axis of rotation, wherein there is configured to be formed between the punching cylinder and the counter-cylinder a punch gap size that is adjustable by means of at least one adjustment device.

DE 29 12 458 A1 discloses a rotary punch for punching envelope blanks out of moving material webs of paper or similar, or for punching shaped cuts out of premanufactured envelope blanks using a counter-roller supported against the bladed roller, having single thrust bearings between which there is located an adjustable body.

DE 10 2013 110 510 A1 discloses a device for rotary punching, having a punching cylinder that is rotatable about a punching cylinder axis, having a counter-pressure cylinder that is rotatable about a counter-pressure cylinder axis, wherein the counter-pressure cylinder has raceways on which the punching cylinder or its punching cylinder raceways can run by way of running surfaces, and having an adjustment device by which a gap size between the punching cylinder and the counter-pressure cylinder is adjustable, and having a further cylinder that takes the form of a support shaft on which the counter-pressure cylinder is directly supported.

DE 10 2007 016 451 A1 discloses a rotary cutting device, comprising a machine stand, a cutting roller that is mounted on the machine stand, and a counter-roller that is mounted on the machine stand, wherein the cutting roller and/or the counter-roller have an inner core and an outer sheath that is arranged around the inner core.

DE 10 2005 022 604 A1 discloses a rotary cutting device having a rotatably mounted cutting roller and a counter-roller, wherein at least one support ring is provided for the purpose of supporting the cutting roller against the counter-roller. A raising device is provided for the purpose of moving the cutting roller and the counter-roller apart.

SUMMARY OF THE INVENTION

In accordance with an embodiment of the invention, a rotary cutting device is provided that has a high degree of operational reliability.

In accordance with an embodiment of the invention, provision is made in the rotary cutting device that, in a support mode, the second roller is supported against a wedge device, that the wedge device has at least one displaceable wedge element, wherein a displacement position of the at least one displaceable wedge element predetermines a spacing between the second roller and the first roller, and that there is associated with the at least one displaceable wedge element a drive device for a displacement movement of the at least one displaceable wedge element on a second displacement axis.

During a machining operation (such as a cutting operation) of the rotary cutting device, a material web is guided between the first roller and the second roller, wherein in particular the first roller and the second roller rotate at the same speed of revolution. A corresponding cutting force is set by way of the cutting pressure device. In this context, in particular the second roller is pressed against the first roller with the required force. Force is correspondingly introduced by way of a roller bearing.

In principle, the spacing between the second roller and the first roller during a machining operation for a workpiece (such as a cutting operation) is fixed, and in particular the second roller is supported against the first roller.

It may arise that the material web includes “disruptions”. Such disruptions may be foreign bodies such as screws, tools, etc. that have found their way onto the material web. For example, there may also be deformed products, doubled products, etc. on the material web, or the material web may be skewed.

As a result of disruptions of this kind, the material web may be thicker in some regions than the normal thickness. This in turn can result, if the second roller is displaceable, in the second roller being raised away, in which case, because of the introduction of force by way of the cutting pressure device, in principle the second roller may bounce back onto the first roller.

In the event of bouncing back in this way, there may be damage to the tool roller, with damage to a blade, and/or to the counter-roller, for example resulting in scoring.

According to the invention, protection against roller impact is provided. In the support mode, in particular in addition to a direct support against the first roller, the second roller is also supported by way of the wedge device.

In particular in this case, the second roller is additionally supported on the machine stand by way of the wedge device. If the first roller is fixed in a manner preventing displacement relative to the machine stand, there is an additional indirect support of the second roller against the first roller by way of the wedge device.

If the second roller is raised away from the first roller as a result of a disruption in the material web, then the drive device ensures a displacement of the at least one displaceable wedge element on the second axis of displacement in order to establish support again, but in this case the support prevents the second roller from impacting against the first roller, because displacement of the at least one wedge element allows the spacing between the second roller and the first roller to be increased.

In this way, effective protection against roller impact is provided in a structurally simple manner.

The wedge device can be integrated in the rotary cutting device and in particular in the machine stand in a manner taking up relatively little space.

The drive device for the displacement movement of the at least one displaceable wedge element may take a structurally simple form. For example, the drive device may take the form of a pneumatic or hydraulic cylinder or a motor (electric motor). The displacement movement may be performed in a structurally simple embodiment by means of a biased drive device, automatically and without the complexity of any open or closed-loop control.

It is most particularly advantageous if, during a machining operation (such as a cutting operation), the first roller is supported against the second roller by way of at least one support ring, which is arranged on the first roller and/or the second roller. As a result of the at least one support ring, during a machining operation contact, or "excessive contact", between a blade of the tool roller and the counter-roller is prevented. It is possible to make a precise cut, and it is possible to set an optimised cutting force.

In one exemplary embodiment, a first support ring and a second support ring are arranged on a tool roller, wherein in particular a blade is positioned between the first support ring and the second support ring in relation to a direction parallel to an axis of rotation of the tool roller. This enables an effective machining operation (such as a cutting operation) to be achieved.

It is most particularly advantageous if the drive device takes a form such that a movement of the at least one displaceable wedge element is driven in a direction in which a spacing between the second roller and the first roller is increased if the second roller is supported against the wedge device. This enables a protection against roller impact to be achieved. As a result of the displaceable wedge element correspondingly following by way of the drive device, a re-established support of the second roller against the wedge device prevents impact against the first roller.

It may be provided for the drive device to take a form such that it creates a bias acting on the at least one displaceable wedge element. In particular, during a machining operation a constant bias applies. In this arrangement, during the machining operation a counter-force exerted by way of the cutting pressure device prevents the at least one displaceable wedge element from being displaced. If the second roller is raised away from the first roller after meeting a disruption, and as a result this counter-force is reduced, then the bias of the drive device has the effect of automatically displacing the at least one displaceable wedge element, and support of the second roller against the wedge device is re-established, but in this case the spacing between the second roller and the first roller is increased and hence in turn a protection against roller impact is provided—that is to say that the second roller cannot impact against the first roller.

In principle, it is possible, if a bias acting on the at least one displaceable wedge element is provided (in the support mode), for this bias not to be subject to closed-loop control. In that case, the bias is predetermined by the drive device. In one embodiment, closed-loop control of the bias is provided. The bias is adapted to the prevailing conditions at the rotary cutting device. For example, the position of a wedge element in the support mode may be changed as a result of guidance play and vibrations in the rotary cutting device. As a result of closed-loop control of the bias, such changes may be taken into account and in particular their effect on the corresponding wedge element may be compensated. In one embodiment, for this purpose there is provided a sensor device that detects movement and/or a change in position of the at least one displaceable wedge element and communicates this to an evaluation device. The evaluation device controls the drive device accordingly in order to adjust the bias in dependence on a detected movement or position of the corresponding wedge element and hence to effect closed-loop control of the bias in a feedback loop.

In an alternative embodiment, the drive device takes a form such that it does not create any bias acting on the at least one displaceable wedge element. As a result, in particular there is no need for compensation of a displacement or change in position of the at least one displaceable wedge element in the support mode. Movements or changes in position of this kind may arise for example as a result of guidance play and/or vibrations in the rotary cutting device. If a bias is provided, movements or changes in position of this kind may be reflected in the bias. If the drive device takes a form such that it can perform its function even in the absence of bias, then changes in movement of this kind do not have a negative effect in the support mode, and need not be compensated.

It is favorable if there is provided a sensor device that detects a position of the second roller in relation to the machine stand, wherein in particular the sensor device takes the form of a distance-sensor device or position-sensor device. As a result of the sensor device, in particular the fact that the second roller has been raised away is detected, and hence termination of the support mode can be detected. This in turn can be used to control the drive device such that a corresponding displacement movement of the at least one displaceable wedge element is performed. In particular, the sensor device is advantageous if no bias is provided between the drive device and the wedge device.

It is favorable if the sensor device is connected, in a manner configured to transfer signals, to an evaluation device, and the evaluation device controls the drive device in dependence on signals from the sensor device. By way of the sensor device, the evaluation device may detect a position, and in particular a raised-away position, of the second roller. This may then be used for a corresponding control of the drive device and movement of the at least one displaceable wedge element.

It is most particularly advantageous if the evaluation device controls the drive device such that, when the sensor device detects a threshold value that corresponds to the second roller being raised away from the first roller and to the second roller no longer being supported against the wedge device, the at least one displaceable wedge element is displaced and in particular is automatically displaced such that the second roller is once again supported against the wedge device, in which case the second roller is at a spacing from the first roller. In this way, it is possible to protect against roller impact automatically, using the detection results of the sensor device. This protection against roller impact is automated. It can be achieved independently of movements or changes in position of the at least one displaceable wedge element in the support mode (caused for example by guidance play and/or vibrations).

It is further favorable if the drive device takes a form such that, when the second roller is raised relatively away from the first roller and the second roller is no longer supported against the wedge device, the at least one displaceable wedge element is displaced automatically such that the second roller is once again supported against the wedge device, in which case the second roller is at a spacing from the first roller. This achieves effective protection against roller impact in a structurally simple manner. In particular, this protection against roller impact can be achieved without the complexity of any open or closed-loop control.

In particular, the support mode, in which the second roller is supported against the wedge device and as a result in particular on the machine stand, prevails during a normal machining operation, and prevails if, after the second roller has been raised relatively away from the first roller, the at least one displaceable wedge element has been displaced for the purpose of the second roller being once again supported against the wedge device. During the machining operation, in particular the second roller is supported against the first roller by way of at least one support ring, and in addition there is support by way of the wedge device. The support mode is briefly canceled if there is in the material web a corresponding disruptive body that results in the second roller being raised away from the first roller. During this raising-away action, the second roller is not supported against the wedge device. The support mode prevails again only once the at least one movable wedge element has followed such that support is once again provided. There is then no longer any (additional) support by way of a support ring.

In one embodiment, the wedge device comprises at least one part-device having a first wedge element and a second wedge element, wherein in the support mode the first wedge element is supported against the second wedge element, and wherein the first wedge element and/or the second wedge element is displaceable and coupled to the drive device. In this way, in the support mode it is possible to achieve permanent support of the second roller against the wedge device. Further, the at least one displaceable wedge element can be made to track in a simple manner in order, if a support mode is briefly canceled, to achieve the support mode again.

In particular in this case, the first wedge element is associated with the first roller and the second wedge element is associated with the second roller.

In one embodiment, the first wedge element is connected to the first roller in a manner preventing displacement relative to the first axis of displacement. If the first roller is prevented from being displaced on the first axis of displacement relative to the machine stand, then the first wedge element is also arranged on the machine stand in a manner preventing displacement relative to the first axis of displacement. In that case it is advantageous from a structural point of view if the first wedge element is displaceable, since displaceability on the first axis of displacement is achievable in a manner preventing displacement relative to the machine stand. In particular, it is then possible to guide the first wedge element on a displacement guide that is prevented from displacement relative to the machine stand.

It may further be provided for the second wedge element to be connected to the second roller in a manner preventing displacement relative to the first axis of displacement. In that case, if the second roller is displaceable relative to the machine stand on the first axis of displacement, it is provided in particular for the second wedge element to be displaceable (relative to the machine stand) with the second roller on the first axis of displacement. This makes it possible in particular in an effective and structurally simple manner to achieve protection against roller impact once the second roller has been raised away from the first roller.

In one embodiment, the first wedge element is arranged on a first bearing housing of the first roller, by way of which the first roller is seated on the machine stand. The first roller is mounted by way of the bearing housing such that it is rotatable about an axis of rotation.

It is further favorable if the second wedge element is arranged on a second bearing housing by way of which the second roller is seated on the machine stand. The second roller is mounted by way of the bearing housing such that it is rotatable. In particular, the second roller is displaceable relative to the machine stand by way of the bearing housing, also on the first axis of displacement.

In principle, it is possible for both the first roller and the second roller to be displaceable relative to the machine stand (on the first axis of displacement). In a structurally simple embodiment, the first roller is positioned on the machine stand in a manner preventing displacement in relation to the first axis of displacement. For example, in that case the second roller, which is seated on the machine stand such that it is displaceable in relation to the first roller on the first axis of displacement, is seated above the first roller in relation to the direction of gravity.

It is favorable if the first axis of displacement is oriented transversely and in particular perpendicular to the second axis of displacement. This produces an effective protection against roller impact, with a structurally simple construction of the protection against roller impact. The corresponding wedge device can be integrated into the rotary cutting device in a manner taking up little space. For example, the first axis of displacement is an axis parallel to the direction of gravity. The second axis of displacement is in that case in particular a horizontal axis.

It is further favorable if the first axis of displacement and/or the second axis of displacement are oriented transversely and in particular perpendicular to an axis of rotation of the first roller. This produces an effective cutting operation with a way of protecting against roller impact that is of structurally simple construction.

In one embodiment, the wedge device has a first part-device and a second part-device, wherein the first part-device and the second part-device are at a spacing from one another in a direction parallel to an axis of rotation of the first roller, and by means of the support mode the second roller is supported both against the first part-device and against the second part-device. This produces a symmetrical support of the second roller in relation to the machine stand.

In particular, the first part-device and the second part-device take the same form, producing an effective support and also an effective protection against roller impact. In particular, once the second roller has been raised away from the first roller, the mutual orientation of the axes of rotation of the first roller and the second roller is not changed, and in particular they remain in a parallel orientation.

It is further favorable if the drive device has a first drive for the first part-device and a second drive for the second part-device, wherein in particular the first drive and the second drive are synchronized. In this way, an effective protection against roller impact can be achieved. The orientation of the axes of rotation of the first roller and the second roller is maintained, and in particular the parallel arrangement of the axes of rotation is maintained.

In one embodiment, the drive device takes a form such that it constantly exerts a force on the at least one displaceable wedge element. In that case, it is in particular provided, during a machining operation and taking into account the force exerted by way of the cutting pressure device, for the force exerted by the drive device to be insufficient to displace the at least one displacement element. Only once there is a reduction in force, arising from the fact that the second roller is raised away from the first roller, does the constant application of force result in a displacement of the at least one movable wedge element. In this way, in a simple manner, the drive device can be used to achieve a type of bias at the wedge device. The at least one movable wedge element can be displaced in a simple manner in the event of a malfunction with no need for example for a complex closed-loop control circuit. It is also possible for a force subject to closed-loop control (a bias subject to closed-loop control) to be constantly exerted on the at least one displaceable wedge element. It is furthermore possible for there to be no permanent bias acting on the displaceable wedge element.

The drive device is or comprises for example a mechanical drive (in particular having a spring device) or pneumatic drive (having one or more pneumatic cylinders) or hydraulic drive (having one or more hydraulic cylinders) or magnetic drive or inductive drive or electromagnetic drive or a motorized drive. The drive device may take a relatively compact form and can be integrated into the rotary cutting device in a manner taking up little space.

In particular, the tool roller is a cutting roller or stamping roller or bladed roller or compactor roller or squeezing roller. The tool roller performs workpiece machining, in particular in a defined region of the workpiece. For example, in the case of a cutting roller the shape of a blade predetermines the region of the workpiece that is to be machined.

In one embodiment, the first roller and/or the second roller are supported by at least one further roller. This makes it possible to prevent excessive deflection of the first roller or the second roller.

It is in particular provided, during a machining operation, for displaceability of the at least one displaceable wedge element to be released and for the drive device to act on the at least one displaceable wedge element, and for a cutting force to be set between the first roller and the second roller by way of the cutting pressure device, wherein the wedge device and the drive device take a form adapted to one another such that during disruption-free operation the second roller is pressed against the first roller (and in particular the second roller is also supported against the first roller by way of at least one support ring), and the spacing between the first roller and the second roller is fixed. In particular, this makes it possible during the cutting operation for the first roller to be supported directly against the second roller (in particular by way of support rings). In addition, there is an in particular indirect support by way of the wedge device. This provides a starting position for achieving effective protection against roller impact.

In that case it is provided, when the second roller is raised away from the first roller because of a disruption in a material web, for the drive device to displace the at least one displaceable wedge element (preferably automatically) such that it is not possible, because support of the second roller against the wedge device is then re-established, for the second roller to impact against the first roller. Taking as a starting point a support mode, when the second roller is raised away from the first roller there is briefly no longer any support against the wedge device. After the at least one displaceable wedge element has been pushed in, support is re-established (wherein in particular there is no longer support by a support ring). However, in the condition with this re-established support, the at least one displaceable wedge element is displaced in relation to its starting position in the cutting operation, and so the spacing between the second roller and the first roller is greater than in the machining operation. This effectively prevents impact of the second roller against the first roller. Conventionally, the rotary cutting device then has to be switched off, which can take place in particular automatically. A machining operation is only possible again after the wedge device having the at least one displaceable wedge element is put into its starting position for the machining operation.

It is advantageous if there is provided a sensor device that determines a displacement position of the at least one displaceable wedge element and in particular determines it in relation to the machine stand. It is then possible, using the sensor device, to detect that the second roller has been raised away from the first roller. This is manifested by a change in the displacement position of the at least one displaceable wedge element. The result is a disruption in normal operation, and then, in particular as a result of the corresponding sensor signals, the rotary cutting device is switched off.

It is then advantageous if there is provided a display device and/or an evaluation device that is coupled to the sensor device in a manner configured to transfer signals. If a new displacement position of the at least one displaceable wedge element that must have been caused by a disruption is detected, then by way of the evaluation device the rotary cutting device can be switched off in order to prevent further possible damage. Further, it is then also possible to detect product-related disruptions at the material web, and corresponding disruptions can be eliminated. A corresponding disruption can be displayed by way of the evaluation device.

According to the invention, a method of the type mentioned in the introduction is provided in which, in a support mode, the second roller is supported against a wedge device, and at least one movable wedge element is displaced such that, when the second roller is raised away from the first roller, the second roller is once again supported against the wedge device, wherein the second roller is then positioned at a spacing from the first roller.

The method according to the invention has the advantages that have already been explained in connection with the rotary cutting device according to the invention.

In particular, the rotary cutting device according to the invention can be operated using the method according to the invention, or the method according to the invention can be performed on the rotary cutting device according to the invention.

In this case, it is advantageous if the displacement movement of the at least one displaceable wedge element is performed automatically. As a result, there is no need for the complexity of any open-loop control or closed-loop control. This produces a high degree of operational reliability.

Favorably, the at least one displaceable wedge element is displaced automatically such that, once the second roller has been raised away from the first roller, the possibility that the second roller will impact against the first roller is prevented because the second roller is supported against the wedge device. The method according to the invention can be performed without the complexity of any open-loop control or closed-loop control. The corresponding wedge device can be integrated into the corresponding rotary cutting device in a manner taking up little space.

It is favorable that, during the machining operation, the first roller and the second roller are operated at the same speed of revolution. This produces a high cutting performance with effective throughput.

The description below of preferred embodiments serves, in connection with the drawings, to explain the invention in more detail.

BRIEF DESCRIPTION OF THE DRAWINGS

FIG. 3(*b*) shows a similar view to FIG. 3(*a*), during a cutting operation;

FIG. 3(*c*) shows a front view of the rotary cutting machine according to FIG. 1, during the cutting operation (FIG. 3(*c*) corresponds to FIG. 3(*b*));

FIG. 4(*b*) shows a front view of the rotary cutting machine according to FIG. 1, in the case of disruption according to FIG. 4(*a*);

DETAILED DESCRIPTION OF THE INVENTION

Figure 1:
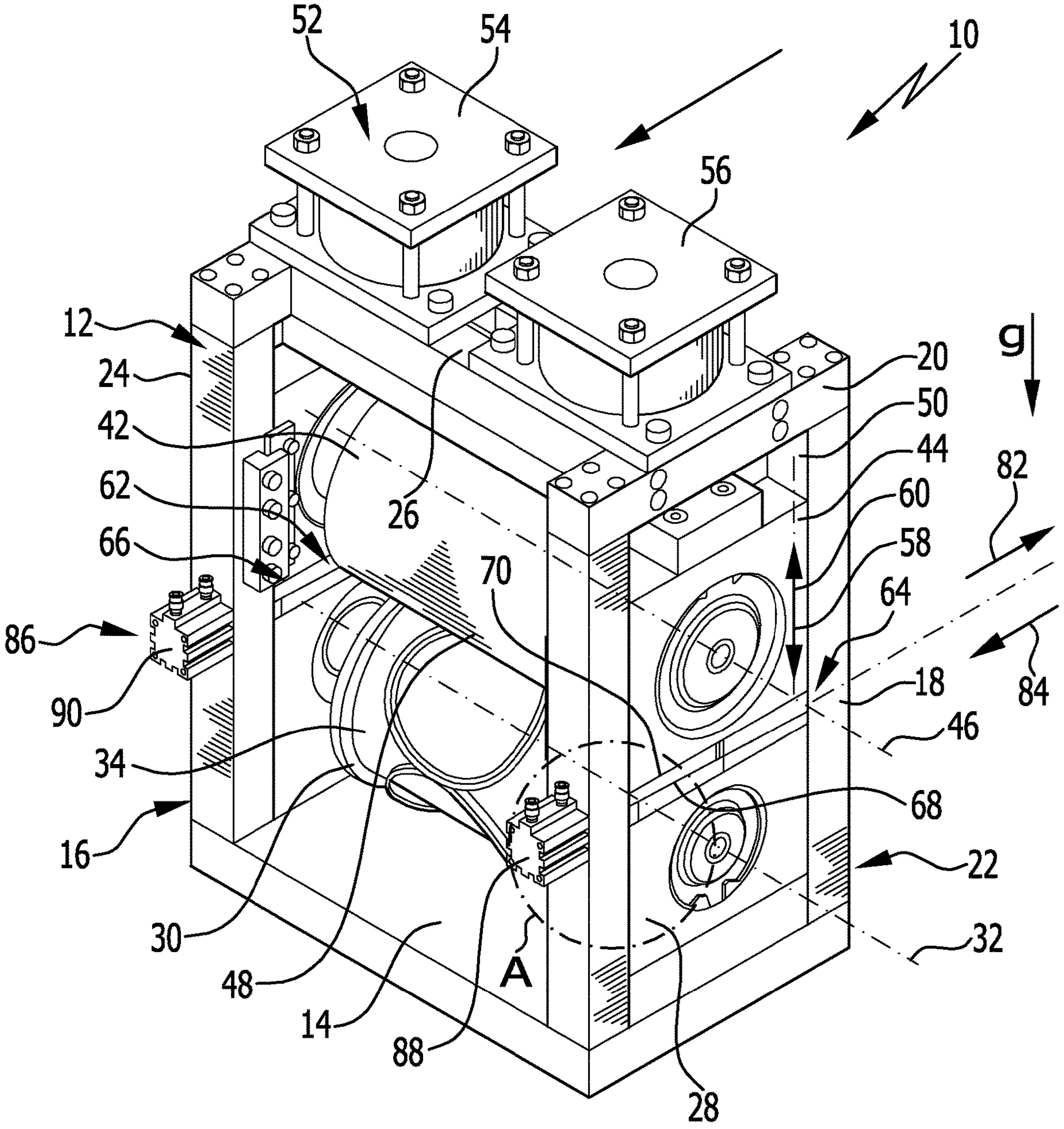
FIG. 1 shows an isometric representation of an exemplary embodiment of a rotary cutting machine according to the invention.

An exemplary embodiment of a rotary cutting device 10 according to the invention (FIGS. 1 to 4(*b*)) comprises a machine stand 12. In one embodiment, the machine stand 12 has a base 14 by way of which the rotary cutting device 10 is mountable on a substructure.

Arranged on the base 14 is a frame 16. The frame 16 comprises bearers 18 oriented transversely in relation to the base 14 and fixed thereto.

When the rotary cutting device 10 is mounted in the intended manner, the bearers 18 are oriented in particular parallel to the direction of gravity g.

Neighboring bearers 18 are connected to one another by way of transverse struts 20.

In particular, the frame 16 comprises a first frame element 22, which is composed of two bearers at a spacing, and a transverse strut arranged in between. Further, the frame 16 comprises a second frame element 24 that takes at least approximately the same form as the first frame element 22 and is seated on the base 14, at a spacing from the first frame element 22. The first frame element 22 and the second frame element 24 are connected to one another by way of one or more struts 26, wherein the strut or struts 26 are seated in an upper region of the respective frame elements 22, 24 and at a spacing from the base 14.

A first roller 30 is mounted on the frame 16 by way of a first bearing housing 28 such that it is rotatable about an axis of rotation 32. Here, the first roller 30 is positioned between the first frame element 22 and the second frame element 24. The first bearing housing 28 is fixed to the first frame element 22 and the second frame element 24 respectively.

In one embodiment, the first roller 30 is held on the frame 16 in a manner preventing displacement.

In the exemplary embodiment shown, the first roller 30 is a tool roller 34 such as a cutting roller. This has a first support ring 36 and, at a spacing, a second support ring 38. Here, the first support ring 36 and the second support ring 38 are spaced from one another in a direction parallel to the axis of rotation 32.

Seated between the first support ring 36 and the second support ring 38 on the tool roller 34 is a blade 40 that takes a form such that a corresponding region of the desired shape is configured to be cut out of a material web.

Further seated on the frame 16 is a second roller 42. The second roller 42 is mounted on a second bearing housing 44 such that it is rotatable about an axis of rotation 46. The axis of rotation 46 is parallel to the axis of rotation 32 of the first roller 30.

The second bearing housing 44 is fixed to the frame 16. The second roller 42 is positioned such that it is oriented with the first roller 30 between the first frame element 22 and the second frame element 24.

If the first roller 30 is a tool roller, than the second roller 42 is a counter-roller (anvil roller) 48.

During a cutting operation of the rotary cutting device 10, the counter-roller 48 is supported against the tool roller 34 by way of the support rings 36, 38. A material web can pass between the support rings 36, 38, against the counter-roller 48 and the tool roller 34.

It is provided in particular for the counter-roller 48 to have a length, in a direction parallel to the axis of rotation 32 or 46, that is greater than the length of the tool roller 34 in the same direction between the first support ring 36 and the second support ring 38.

It is provided in particular for a rotary drive for the rotary movement of the first roller 30 about the axis of rotation 32 to be seated on the first bearing housing 28. In particular, a drive for a rotary movement of the second roller 42 about the axis of rotation 46 is seated on the second bearing housing 44.

For a cutting operation of the rotary cutting device 10, it is provided in particular for the first roller 30 and the second roller 42 to be driven at the same speed of revolution.

In the embodiment shown, the second roller 42 is seated above the first roller 30, in relation to the direction of gravity g.

In principle, it is also possible for the tool roller 34 to be seated above the counter-roller 48.

The second roller 42 is mounted on the machine stand 12 such that it is displaceable on the machine stand 12 on a first axis of displacement 50.

The first axis of displacement 50 lies transversely and in particular perpendicular to the axis of rotation 32 or 46.

In particular, the first axis of displacement 50 is parallel to the direction of gravity g if the machine stand 12 is mounted on a substructure by way of its base 14.

For the purpose of guiding displacement of the second roller 42 on the machine stand 12, there is provided a corresponding guide device.

Seated on the machine stand 12 is a cutting pressure device 52 by which a cutting force is settable between the tool roller 34 and the counter-roller 48 during a cutting procedure. The cutting pressure device 52 presses the second roller 42 against the first roller 30 (supported at the support rings 36, 38) with the desired force. As a result of the displaceability of the second roller 42 on the first axis of displacement 50, this accordingly allows a cutting force or a cutting pressure to be set at a material web.

The cutting pressure device 52 has in particular corresponding setting arrangements, such as one or more hydraulic cylinders or one or more pneumatic cylinders. In principle, the cutting pressure device 52 may also have motorized drives for setting the cutting force.

In one exemplary embodiment, the cutting pressure device 52 has a first sub-unit 54 and a second sub-unit 56. These allow the second roller 42 (the counter-roller 48) to be pressed with the desired force, on the first axis of displacement 50, in the direction of the first roller 30 (the tool roller 34), with the result that the desired cutting force is set.

In particular, by way of the cutting pressure device 52 a pressing force of the second roller 42 in a direction 58 toward the first roller 30 is set, on the first axis of displacement 50.

The second roller 42 is configured to be raised away from the first roller 30 in an opposing direction 60 to the direction 58.

A wedge device 62 is provided, by way of which the second roller 42 is supported in relation to the first roller 30 in a support mode (this is explained in more detail below).

In the exemplary embodiment shown, the first roller 30 is arranged on the machine stand 12 in a manner preventing displacement (in particular on the first axis of displacement 50). By way of the wedge device 62, this allows the second roller 42 to be supported in relation to the machine stand 12 in the support mode.

During a cutting operation, the counter-roller 48 is supported against the first roller 30 by way of the support rings 36, 38. Further, it is supported on the machine stand 12 by way of the wedge device 62.

The wedge device 62 is arranged and formed correspondingly such that, during the cutting operation, support of the second roller 42 is possible both directly against the first roller 30, by way of the support rings 36, 38, and also indirectly, by way of the machine stand 12.

In particular, the wedge device 62 comprises a first part-device 64 that is associated with the first frame element 22, and a second part-device 66 that is associated with the second frame element 24. The first part-device 64 and the second part-device 66 take basically the same form.

The first part-device 64 and the second part-device 66 are spaced from one another in a direction parallel to the axis of rotation 32 or 46. Between them in relation to this direction there are positioned the first roller 30 and the second roller 42 respectively.

The first part-device 64 and the second part-device 66 each have a first wedge element 68 and a second wedge element 70. The first wedge element 68 is connected to the first bearing housing 28 in a manner preventing displacement in relation to the first axis of displacement 50.

The first wedge element 68 is displaceable in relation to the machine stand 12 or the first bearing housing 28 on a second axis of displacement 72.

The second axis of displacement 72 is transverse and in particular perpendicular in relation to the first axis of displacement 50. Further, the second axis of displacement 72 is transverse and in particular perpendicular to the axis of rotation 32 or 46.

The first wedge element 68 of the wedge device 62 is guided on a corresponding displacement guide.

In one embodiment, the second wedge element 70 is arranged on the second bearing housing 44 and is fixedly connected thereto. It is prevented from displacement in relation to the second bearing housing 44 both on the first axis of displacement 50 and on the second axis of displacement 72.

In the event of displacement of the second roller 42 (of the second bearing housing 44) on the first axis of displacement 50, the second wedge element 70 is displaced in synchronism therewith.

The second wedge element 70 is adapted to the first wedge element 68.

The first wedge element 68 has a first support face 74. The second wedge element 70 has a second support face 76, opposed to the first support face.

In a support mode, the second support face 76 lies on the first support face 74.

Both the first support face 74 and the second support face 76 are oblique faces. They have the same value in respect of inclination.

In a support mode, a spacing between a lower side 78 of the first wedge element 68 and an upper side 80 of the second wedge element 70 is the same along the second axis of displacement 72.

A spacing between the lower side 78 of the first wedge element 68 and the first support face 74 varies along the second axis of displacement 72.

Further, a spacing between the upper side 80 of the second wedge element 70 and the second support face 76 varies along the second axis of displacement 72. Here, the variation is in each case linear.

In the exemplary embodiment shown, a height of the first wedge element 68 between the lower side 78 and the first support face 74 decreases in a direction 82. A height of the second wedge element 70 between the upper side 18 and the second support face 76 decreases in a direction 84 that is an opposing direction to the direction 82.

Associated with the wedge device is a drive device, designated 86 as a whole. Here, the drive device 86 comprises a first drive 88, which is associated with the first part-device 64, and a second drive 90, which is associated with the second part-device 66.

In this arrangement, the first drive 88 and the second drive 90 respectively act on the respective first wedge element 68 of the corresponding first part-device 64 and the second part-device 66. By way of the respective drive 88 and 90, the corresponding first wedge element 68 is displaced in the direction 82.

Here, the drive device 86 takes a form such that the first drive 88 and the second drive 90 are synchronized, with the result that the respective first wedge elements 68 of the first part-device 64 and the second part-device 66 are displaced in synchronism in the direction 82 (see below) and as a result a parallel orientation of the axes of rotation 32 and 46 is maintained.

In one embodiment, the drive device 86 takes a form such that it is biased. During active operation (cutting operation) of the rotary cutting device 10, in particular the drive device 86 exerts a constant force on the respective wedge element 68. In an alternative embodiment, described below with reference to FIGS. 6 and 7, the drive device is formed without bias.

During normal operation, the force is such that the corresponding first wedge element 68 does not undergo any movement.

A counter-force of the second roller 42 acting on the wedge device 62, and by way of the second wedge element 70 on the first wedge element 68, is generated in particular by the cutting pressure device 52 and prevents the respective first wedge element 68 from being displaced.

The drive device 86 having the first drive 88 comprises in particular a hydraulic drive or a pneumatic drive or a mechanical drive such as a spring device. In principle, it is also possible for the drive device 86 to comprise a motorized drive or an electric, electric motor or magnetic drive, etc.

In the exemplary embodiment shown, at the first drive 88 and the second drive 90 respectively, the drive device 86 has a pneumatic cylinder 92 having connections 94. This pneumatic cylinder 92 is coupled to the first wedge element 68, or the second wedge element 70 in the case of the second drive 90, and constantly urges it at a corresponding force.

In this arrangement, it is possible for the bias created by the drive device 86 on the first wedge element 68 not to be, or to be, subject to closed-loop control. In the case of a bias not subject to closed-loop control, the bias is predetermined by the drive device 86. For example, a constant force is applied. In the case of a bias subject to closed-loop control, the bias is adapted to the actually prevailing conditions. For example, this allows movements of the wedge element 68 resulting from guidance play and vibrations to be compensated.

In the case of such an embodiment of a bias subject to closed-loop control, in particular a sensor device 91 is provided that detects a movement or a change in position in particular of the respective first wedge element 68. Corresponding sensor signals are forwarded to an evaluation device 98 (see below). The evaluation device 98 then controls the first drive 88 and the second drive 90 respectively as regards the bias, and adapts this to the current state of the respective wedge element 68.

In particular, there is provided for the first wedge element 68 a respective separate sensor device 91, associated with the first drive 88, and there is provided another sensor device 91 for the corresponding wedge element associated with the second drive 90.

Figure 2:
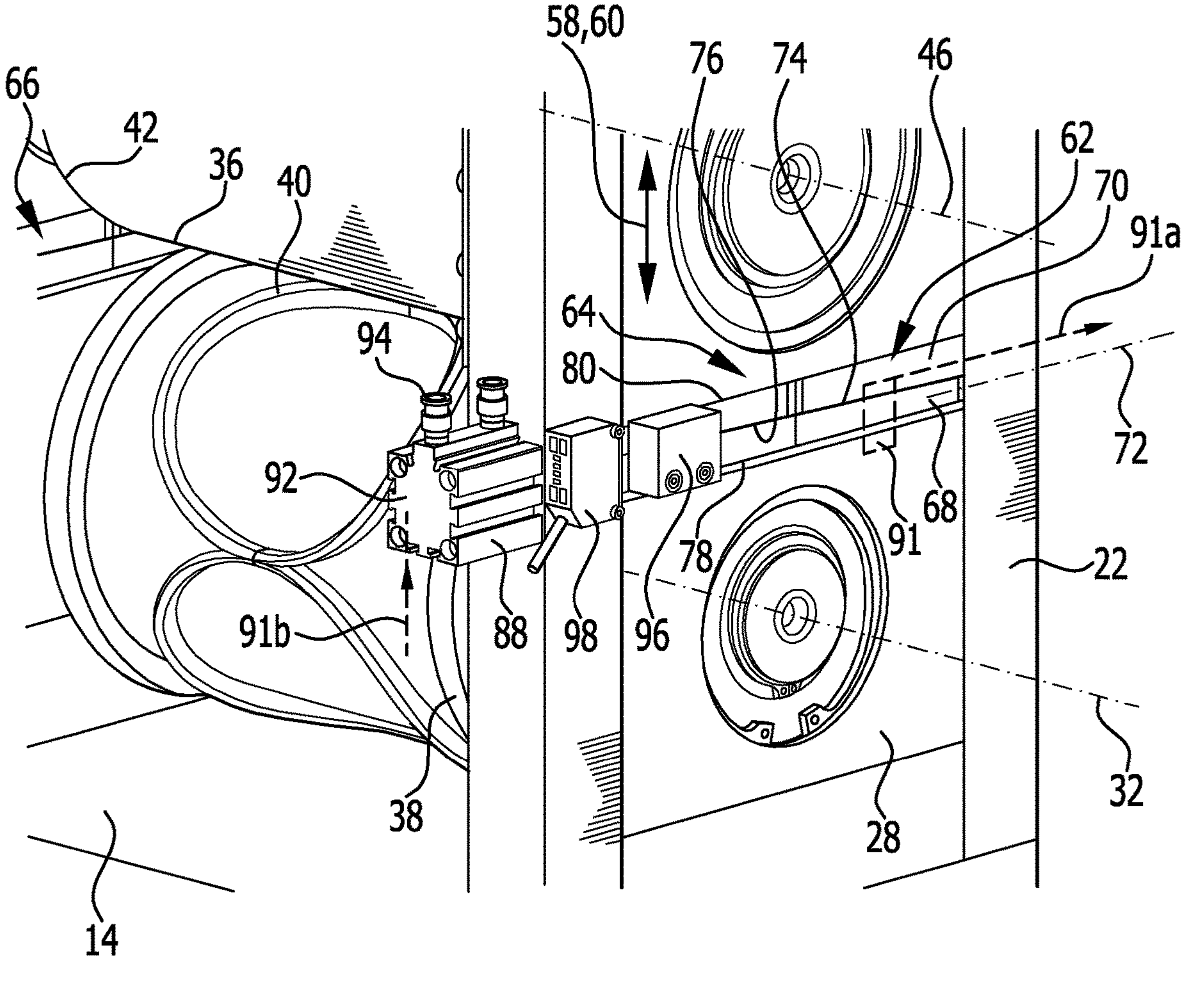
FIG. 2 shows a partial representation of the region A of the rotary cutting machine according to FIG. 1, with a sensor device.

The fact that the sensor device 91 is connected to the evaluation device 98 in a manner configured to transfer signals is indicated schematically in FIG. 2 by a line having the reference numeral 91*a*. The fact that the evaluation device 98 is connected to the first drive 88 in a manner configured to transfer signals, for the purpose of setting the bias at the first drive 88 in relation to the first wedge element 68, is indicated schematically in FIG. 2 by a signal line having the reference numeral 91*b*.

Closed-loop control of the bias allows changes in the position of the respective wedge element 68, for example as a result of guidance play and vibrations in the rotary cutting device 10, to be detected and adjusted for or compensated. This closed-loop control of the bias is performed in this case in a support mode (see below), in which the second wedge element 70 is supported against the first wedge element 68 and hence the second roller 42 is indirectly supported against the first roller 30.

It is also possible—as explained in more detail below—for the drive device not to have any bias relative to the wedge device 62 (in the support mode).

A decrease in the counter-force brings about a movement of the first wedge element 68 in the direction 82.

In one embodiment, there is associated with the wedge device 62 a sensor device 96, by which a displacement position of the respective first wedge element 68 or of only one wedge element 68 on its displacement guide is detectable, in particular in relation to the first bearing housing 28.

The sensor device 96 is connected to an evaluation device 98 and/or a display device in a manner configured to transfer signals. This makes it possible to determine whether the first wedge element 68 has been displaced.

In particular, a displacement of the first wedge element 68 can, by way of the evaluation device 98, result in a cutting operation of the rotary cutting device 10 being switched off.

Figure 3B:
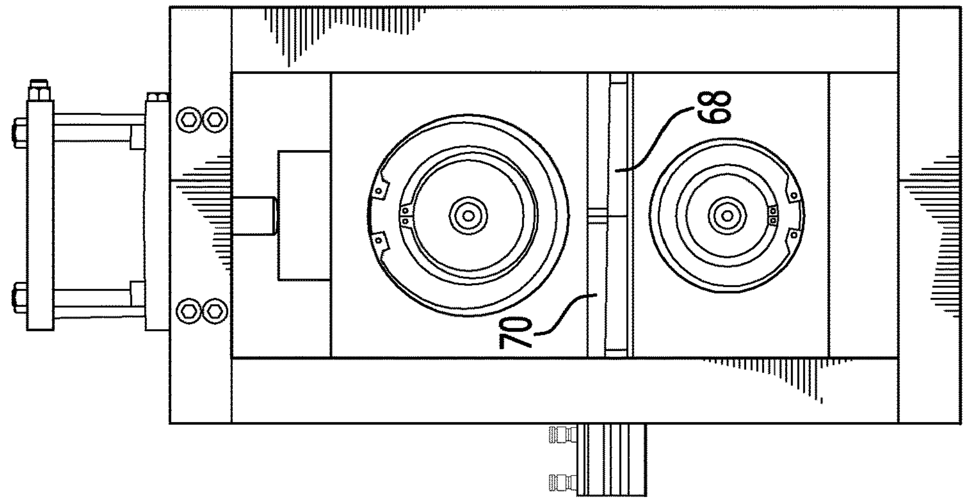
FIG. 3(*a*) shows a side view of the rotary cutting machine according to FIG. 1, in a non-active mode.
Figure 3A:
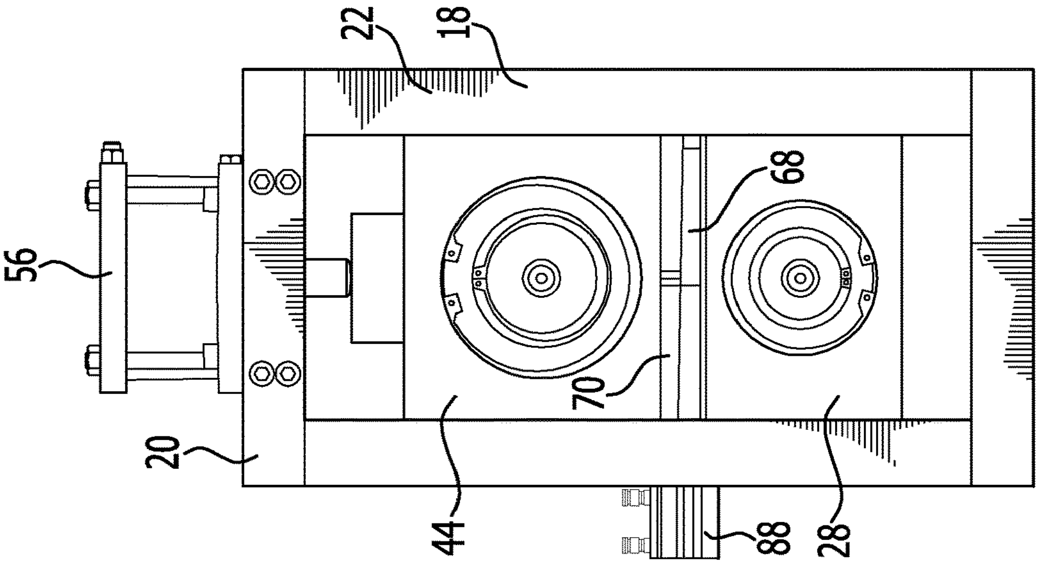
Figure 3C:
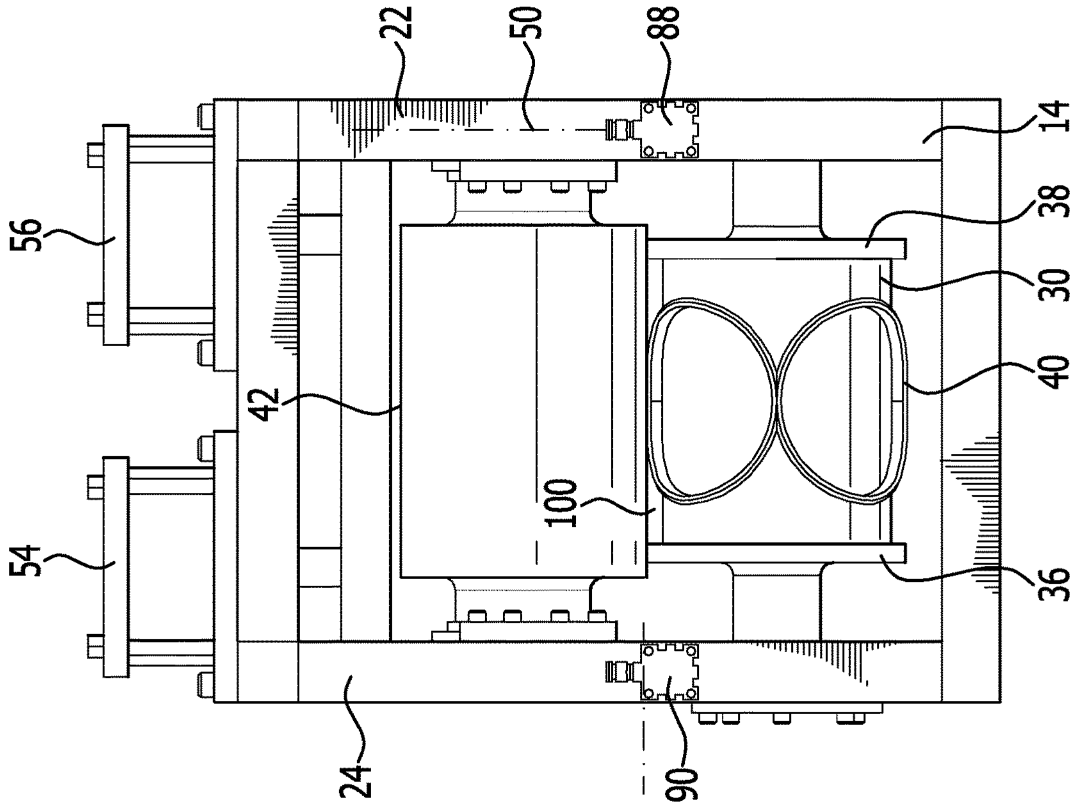

The rotary cutting device 10 operates as follows:

When operation of the rotary cutting device 10 is inactive (FIG. 3(*a*)), the first wedge element 68 is positioned such that it is not possible to perform a cutting operation.

During an active cutting operation of the rotary cutting device 10 (FIGS. 3(*b*) and (*c*)), a material web 100 (FIG. 3(*c*)) is guided between the counter-roller 48 and the tool roller 34, and in so doing between the support rings 36, 38.

During the cutting operation, the tool roller 34 is supported against the counter-roller 48 by way of its support rings 36, 38. Here, the counter-roller 48 is pressed against the tool roller 34 on the first displacement axis 50 with the desired force by way of the cutting pressure device 52 in order to set the corresponding cutting force.

At the wedge device, the first wedge element 68 is positioned such that a support mode prevails and the second wedge element 70 is supported against the first wedge element 68. This in turn causes the second roller 42 (the counter-roller 48) to be indirectly supported against the first roller, and at the same time to be directly supported on the machine stand 12.

The counter-roller 48 is supported directly against the tool roller 34 by way of the support rings 36, 38.

The position of the first wedge element 68 in the support mode and thereby during the cutting operation is such that a cutting operation is in fact performed on the material web 100 with the desired cutting force.

It may occur that the material web 100 contains foreign bodies and in particular metal foreign bodies, such as screws, overlooked tools, and similar.

If such foreign bodies come between the tool roller 34 and the counter-roller 48, this causes the first roller 30 and the second roller 42 to be raised away from one another.

In one embodiment, in which the second roller 42 (the counter-roller 48) is mounted on the machine stand 12 displaceably on the first displacement axis 50, such a foreign body may result in the counter-roller 48 being raised away from the first tool roller 34 in the direction 60, in particular in opposition to the direction of gravity g. Disruptions such as deformed products, doubled products, skewed material webs, etc. can also result in raising away.

In the event of such a movement, the support mode at the wedge device 62 is (briefly) canceled. As a result of the second roller 42 being moved away from the first roller 30 in the direction 60, along the first axis of displacement 50, the second wedge element 70 is detached from the first wedge element 68—that is to say the second support face 76 is no longer in contact with the first support face 74.

The result is that the counter-force that has hitherto prevented the first wedge element 68 from being displaced in the direction 82, in the support mode, is reduced such that, driven by the drive device 86, the first wedge element 68 moves in the direction 82.

Figure 4A:
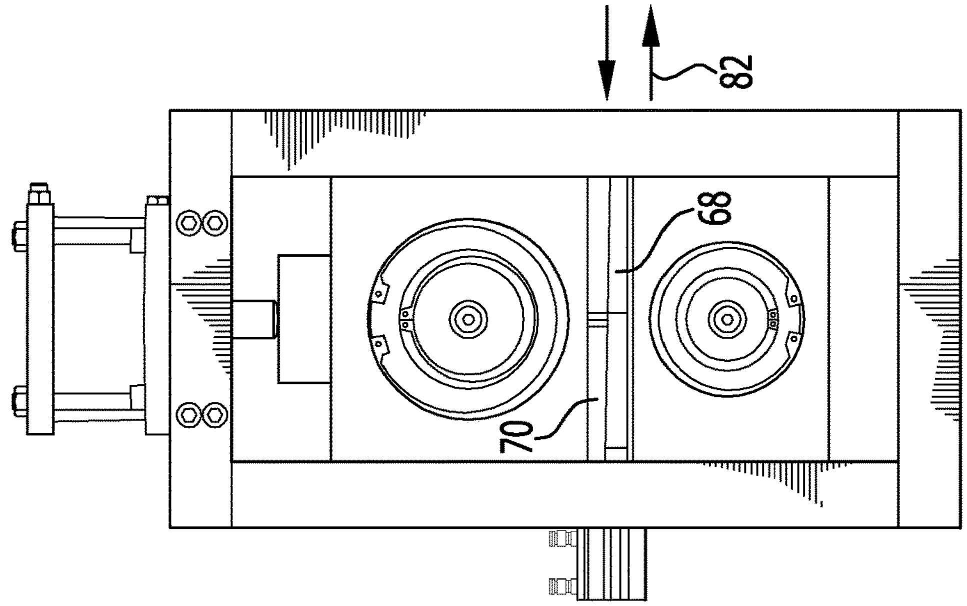
FIG. 4(*a*) shows the same view as FIG. 3(*a*) after a disruption, with a wedge element displaced.
Figure 4B:
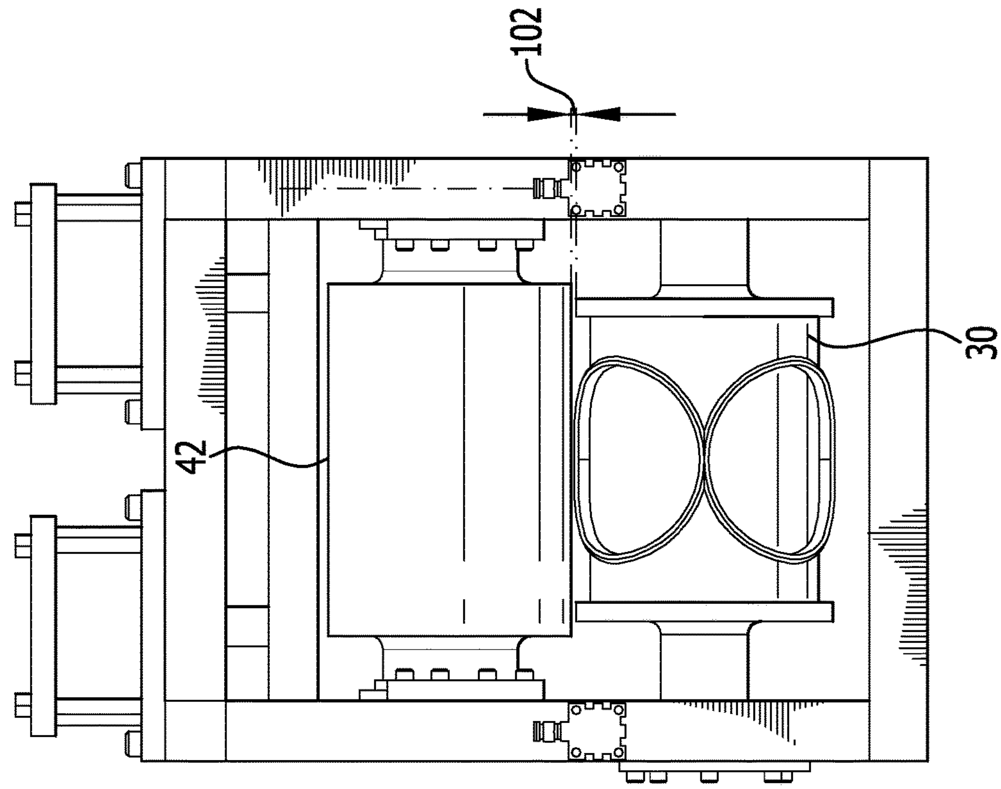

This is shown in FIG. 4(*a*). There, the wedge element 68 is displaced in the direction 82 by comparison with the position in FIG. 3(*b*), which shows the position of the first wedge element 68 during the cutting operation.

In this case, the first wedge element 68 is displaced such that the first support face 74 abuts against the second support face 76 again.

This displacement of the first wedge element 68 is performed automatically by the bias of the drive device 86 as soon as the counter-force on the wedge device 62 is reduced as a result of the counter-roller 48 being raised away from the tool roller 34.

As a result of this movement of the first wedge element 68 in the direction 82, the support mode is once again set, in which the second roller 42 (the counter-roller 48) is supported on the machine stand 12 by way of the wedge device 62.

However, there is a spacing 102 (cf. FIG. 4(*b*), which corresponds to FIG. 4(*a*)) between the second roller 42 and the tool roller 30. This spacing is set automatically by the automatic displacement of the first wedge element 68.

As a result of the spacing 102, the counter-roller 48 and the tool roller 34 are no longer in contact.

If, starting from a support mode, the second roller 42 is raised away from the first roller 30, then the corresponding first wedge element 68 follows automatically as a result of the drive device 86, and a support mode is once again set, but in this case the second roller 42 is at a spacing from the first roller 30. This prevents the second roller 42, as a counter-movement after the raising away, from being displaced in the direction of the first roller 30 again on the axis of displacement 50 (that is to say, in the direction 58) and in so doing prevents the tool roller 34 and the counter-roller 48 from impacting against one another. A mutual impact of this kind can result in damage to the blade 40 and/or the counter-roller 48.

To a certain extent, the automatic displacement of the first wedge element 68 in the direction 82 "freezes" raising away of the second roller 42 from the first roller 30 in a manner caused by disruptions in the material web 100, in order to prevent the counter-roller 48 from impacting against the tool roller 34.

The sensor device 86 makes it possible to detect a disruption of this kind, which has resulted in a corresponding displacement of the first wedge element 68. The displacement position of the first wedge element 68 can be used to detect the fact that the second roller 42 has been raised away from the first roller 30.

At that point, a proper cutting operation is no longer possible. By way of the evaluation device 98, in particular the rotary cutting device 10 is then halted—that is to say that rotation of the first roller 30 and the second roller 42 is halted.

For example, it is then provided for the first wedge element 68 to be reset to its displacement position for a cutting operation, this resetting being initiated by a user.

The rotary cutting device 10 is for example used for manufacturing personal care items or packaging items.

When operation of the rotary cutting device 10 is inactive, in particular the first wedge element 68 is not urged under force by the drive device 86.

Above, the first wedge element 68 was described as displaceable and coupled to the drive device 86.

As an alternative, it is also possible for the second wedge element 70 to be displaceable and in this case in particular to be displaceable in the direction 84.

It is also possible for both the first wedge element 68 and the second wedge element to be displaceable in opposing directions in order to provide securing against impact. A drive device then takes a corresponding form.

As a result of the solution according to the invention, it is possible to provide a protection against impact between the counter-roller 48 and the tool roller 34 that is automated and in particular prevents damage from occurring at the counter-roller 48 and/or the tool roller 34 with a low hardening depth. A protection against roller impact is provided that is integrated into the rotary cutting device 10 in a structurally simple manner.

The first wedge element 68 and the second wedge element 70 have a self-locking effect that prevents the raised roller (in the exemplary embodiment, the second roller 42) from falling back into place.

In the exemplary embodiment described above, the tool roller 34 is a cutting roller. It is also possible for the tool roller, which acts on a workpiece and during operation "modifies" it, to be for example a stamping roller, bladed roller, squeezing roller or compactor roller, etc.

Figure 5:
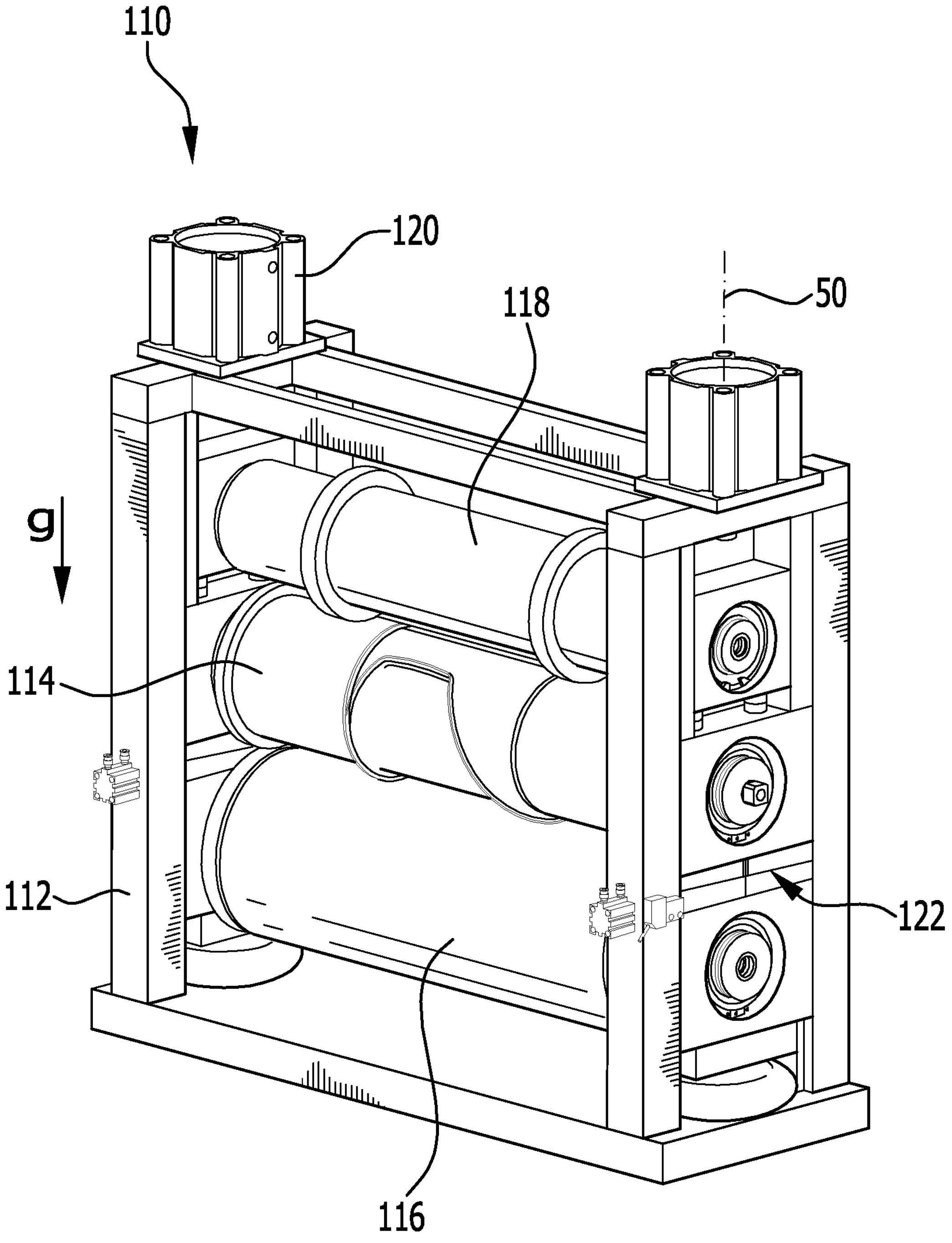
FIG. 5 shows an isometric representation of a further exemplary embodiment of a rotary cutting device according to the invention.

A further exemplary embodiment of a rotary cutting device according to the invention, which is shown in FIG. 5 and designated 110, comprises a machine stand 112 on which there is seated, by way of a bearing housing, as the first roller 114 a tool roller, for example a cutting roller. Further, a second roller 116 that is a counter-roller is seated on the machine frame 112 below the first roller 114, in relation to the direction of gravity g.

During a normal cutting operation, a third roller 118 acts on the first roller 114 and is positioned on the machine frame 112 above the first roller 114, in relation to the direction of gravity g.

The third roller 118 is a support roller that is supported against the first roller 114 and prevents the first roller 114 from undergoing excessive deflection during a cutting operation.

The second roller 116 is held against the machine stand 112 such that it is displaceable on a first axis of displacement 50.

The third roller 118 is likewise movable such that it is displaceable on the first axis of displacement 50.

The second roller 116 can be pressed against the first roller 114 by way of a cutting pressure device 120, for the purpose of setting a cutting force.

A wedge device 122 having at least one displaceable wedge element is provided, and enables support of the second roller 116.

In principle, the wedge device 122 operates in the same way as the wedge device 62 described above.

It is also possible in principle for the counter-roller to be arranged above the tool roller in relation to the direction of gravity g, and for the third roller (support roller) to be arranged below the tool roller in relation to the direction of gravity g.

It is also possible to provide support for the counter-roller by way of a further roller.

As a result of the wedge device 122, a protection against roller impact can be achieved, as described above with reference to the rotary cutting device 10; the possibility that after the second roller 116 has been raised away it can impact against the first roller 114 as a result of a disruption on a material web is prevented.

Figure 6:
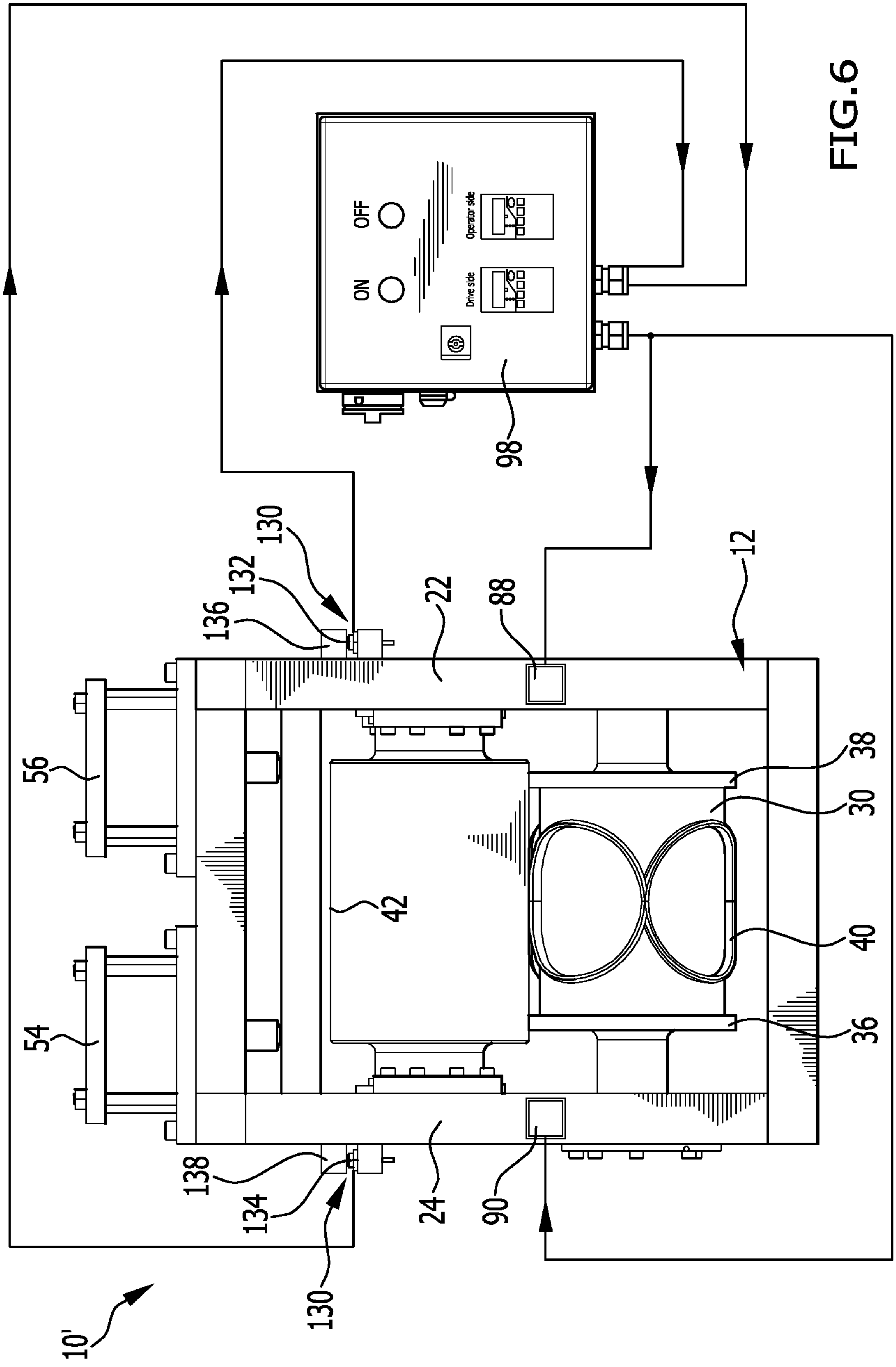
FIG. 6 shows a variant of the rotary cutting machine according to FIG. 1, in a front view.

A further exemplary embodiment of a rotary cutting device according to the invention, shown schematically in FIG. 6 and designated 10', takes basically the same form as the rotary cutting device 10. Like reference numerals are used for like elements.

The rotary cutting device 10' comprises a sensor device 130 that serves to detect the position of the second roller 42 in relation to the machine stand 12. The sensor device 130 is a distance-sensor device or position-sensor device that detects the position of the second roller 42 in relation to the machine stand 12 and hence also in relation to the first roller 30.

Sensor signals of the sensor device 130 are emitted to the evaluation device 98. Further, for the purpose of controlling the drive device 86, the evaluation device 98 is connected to the first drive 88 and the second drive 90 in a manner configured to transfer signals; the evaluation device 98 forms a controller for the drive device 86.

The sensor device 130 is connected to the evaluation device 98 in a manner configured to transfer signals. On the basis of sensor results from the sensor device 130, the evaluation device 98 controls the drive device 86 having the first drive 88 and the second drive 90.

In one embodiment, the sensor device 130 comprises a first sensor 132 that is associated with the first frame element 22. It further comprises a second sensor 134 that is associated with the second frame element 24.

In one embodiment, the first sensor 132 and the second sensor 134 are connected to the second roller 42 in a manner preventing displacement.

Displacement of the second roller 42 brings about displacement of the sensors 132 and 134.

Arranged fixed to the first frame element 22 is a first encoder 136 that corresponds with the first sensor 132. By way of the first sensor 132, a position in relation to the first encoder 136 can be detected, or a spacing between the first sensor 132 and the first encoder 136 can be measured.

Correspondingly, a second encoder 138 is arranged on the second frame element 24 in a manner preventing displacement, and cooperates with the second sensor 134.

In principle, it is also possible for the encoders to be connected to the second roller 42 in a manner preventing displacement and for the corresponding sensors of the sensor device 130 to be arranged fixed to the machine stand 12 (at the frame elements 22, 24). Furthermore, it is possible for one encoder to be seated on the machine stand 12 in a manner preventing displacement and for the other encoder to be prevented from displacement in relation to the second roller 42, and correspondingly for the sensor associated with the encoder that is displaceable with the second roller 42 to be seated on the machine stand 12 in a manner preventing displacement; the sensor associated with the encoder that is fixed to the machine stand 12 is in that case displaceable with the second roller 42.

As mentioned, using the sensor device 130, the position of the second roller 42 in relation to the machine stand 12 and hence also in relation to the first roller 30 and the wedge device 62 can be detected. In that case, using the sensor device 130, the fact that the second roller 42 has been raised away and thus that a support of the second roller 42 against the wedge device 62 has been canceled can be detected. In particular, there is used as the detection result for raising away the fact that a particular threshold value determined by the sensor device 130 has been exceeded.

The evaluation device 98 controls the drive device 86 in dependence on the sensor results from the sensor device 130. In particular, if the particular threshold value is exceeded, the drive device 86 is operated such that the first wedge element 68 is displaced in such a way that support of the second roller 42 against the wedge device 62 is re-established, in which case the second roller 42 is at a spacing from the first roller 30.

As a result of the sensor device 130 and in cooperation with the evaluation device 98, the drive device 86 can take a form such that there is no need for bias in relation to the first wedge element 68. In that case, the drive device 86 can be controlled such that a force is only exerted on the first wedge element 68 once the above-mentioned threshold has been detected by the sensor device 130. As a result, there is no need to compensate for example changes in the position of the first wedge element 68 in the support mode resulting from guidance play and/or vibrations at the rotary cutting device 10'.

Using the sensor device 130 having the sensors 132, 134, it is possible to detect the position of the second roller 42 in the machine stand 12 both in relation to the first frame element 22 and the second frame element 24. In particular, the first drive 88 and the second drive 90 are controlled separately. This allows optimized protection against roller impact to be achieved.

Figure 7:
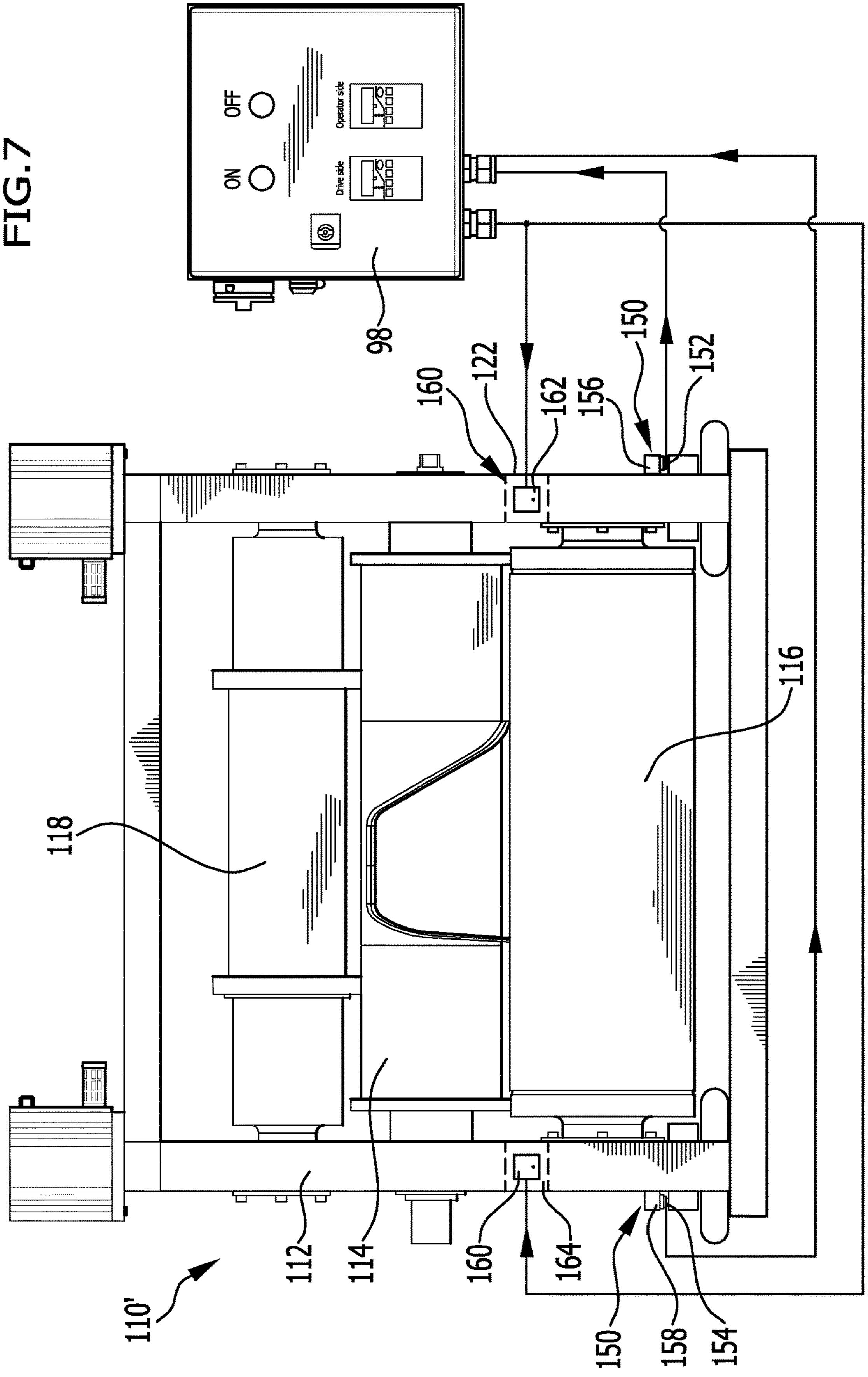
FIG. 7 shows a variant of the rotary cutting device according to FIG. 5, in a front view.

In a further embodiment 110' of a rotary cutting device according to the invention, which is shown schematically in FIG. 7 and takes basically the same form as the rotary cutting device 110, there is provided a sensor device 150 that detects a position of the second roller 116 in relation to the machine stand 112. The sensor device 150 has in particular a first sensor 152 and a second sensor 154 that are associated with opposing sides of the machine stand 12 (corresponding to the frame elements).

In one embodiment, the first sensor 152 and the second sensor 154 are each fixedly connected to the machine stand 112. Connected to the second roller 116 in a manner preventing displacement are a first encoder 156 and a second encoder 158. The first sensor 152 cooperates with the first encoder 156; the second sensor 154 cooperates with the second encoder 158. Using the sensor device 150, it is possible to detect the spacing between the first sensor 152 and the first encoder 156, and between the second sensor 154 and the second encoder 158. In this way, the position of the second roller 116 on the machine stand 112 and hence the position of the second roller 116 in relation to the wedge device 122 and that of the second roller 116 in relation to the first roller 114 can be detected.

The sensor device 150 is connected to the corresponding evaluation device 98 in a manner configured to transfer signals, and delivers its sensor signals thereto. The evaluation device 98 controls a drive device 160 having a first drive 162 and a second drive 164 for the wedge device 122. The evaluation device 98 is a controller for the drive device 160.

As described above with reference to the rotary cutting device 10', if a particular threshold value of the position of the second roller 116 on the machine stand 112 is detected, the drive device 160 is controlled such that the corresponding first wedge element of the wedge device 122 is displaced in such a way that once support is canceled by displacing the displaceable wedge element support is automatically re-established.

LIST OF REFERENCE NUMERALS

10, 10' Rotary cutting device
12 Machine stand
14 Base
16 Frame
18 Bearer
20 Transverse strut
22 First frame element
24 Second frame element
26 Strut

28 First bearing housing
30 First roller
32 Axis of rotation
34 Tool roller
36 First support ring
38 Second support ring
40 Blade
42 Second roller
44 Second bearing housing
46 Axis of rotation
48 Counter-roller
50 First axis of displacement
52 Cutting pressure device
54 First sub-part
56 Second sub-part
58 Direction
60 Opposing direction
62 Wedge device
64 First part-device
66 Second part-device
68 First wedge element
70 Second wedge element
72 Second axis of displacement
74 First support face
76 Second support face
78 Lower side
80 Upper side
82 Direction
84 Direction
86 Drive device
88 First drive
90 Second drive
91 Sensor device
91*a* Connection configured to transfer signals
91*b* Connection configured to transfer signals
92 Pneumatic cylinder
94 Connection
96 Sensor device
98 Evaluation device
100 Material web
102 Spacing
110, 110' Rotary cutting device
112 Machine stand
114 First roller
116 Second roller
118 Third roller
120 Cutting pressure device
122 Wedge device
130 Sensor device
132 First sensor
134 Second sensor
136 First encoder
138 Second encoder
150 Sensor device
152 First sensor
154 Second sensor
156 First encoder
158 Second encoder
160 Drive device
162 First drive
164 Second drive

What is claimed is:

1. A rotary cutting device, comprising:

a machine stand;

a first roller that is mounted rotatably on the machine stand;

a second roller that is mounted rotatably on the machine stand;

wherein either (i) the first roller is a tool roller and the second roller is a counter-roller, or (ii) the second roller is a tool roller and the first roller is a counter-roller; and wherein the second roller is mounted on the machine stand such that the second roller is displaceable on a first displacement axis; and a cutting pressure device by way of which a cutting pressure is configured to be exerted between the second roller and the first roller;

wherein the second roller is displaceable during a cutting operation;

wherein, in a support mode, the second roller is supported against a wedge device;

wherein the wedge device has at least one displaceable wedge element;

wherein a displacement position of the at least one displaceable wedge element predetermines an initial spacing between the second roller and the first roller;

wherein there is associated with the at least one displaceable wedge element a drive device for a displacement movement of the at least one displaceable wedge element on a second displacement axis;

wherein the drive device is adapted such that, when the second roller is raised relatively away from the first roller during the cutting operation and the second roller is no longer supported against the wedge device, the at least one displaceable wedge element is displaced automatically such that the second roller is once again supported against the wedge device, in which case the second roller is at an increased fixed spacing from the first roller which is larger than the initial spacing; and wherein the drive device is adapted such that the drive device constantly exerts a biasing force on the at least one displaceable wedge element during the cutting operation.

2. The rotary cutting device as claimed in claim 1, wherein, during the cutting operation, the first roller is supported against the second roller by way of at least one support ring, which is arranged on at least one of the first roller and the second roller.

3. The rotary cutting device as claimed in claim 2, wherein:

the at least one support ring comprises a first support ring and a second support ring that are arranged on the tool roller, and a blade is positioned on the tool roller between the first support ring and the second support ring in relation to a direction parallel to an axis of rotation of the tool roller.

4. The rotary cutting device as claimed in claim 1, wherein the drive device is adapted such that a movement of the at least one displaceable wedge element is driven in a direction in which the initial spacing between the second roller and the first roller is increased to the increased spacing if the second roller is supported against the wedge device.

5. The rotary cutting device as claimed in claim 1, wherein the biasing force is subject to closed-loop control.

6. The rotary cutting device as claimed in claim 1, having a sensor device that detects a position of the second roller in relation to the machine stand.

7. The rotary cutting device as claimed in claim 6, wherein the sensor device is connected, in a manner configured to transfer signals, to an evaluation device, and the evaluation device controls the drive device in dependence on signals from the sensor device.

8. The rotary cutting device as claimed in claim 7, wherein the evaluation device controls the drive device such that, when the sensor device detects a threshold value that corresponds to the second roller being raised away from the first roller and to the second roller no longer being supported against the wedge device, the at least one displaceable wedge element is displaced.

9. The rotary cutting device as claimed in claim 1, wherein the support mode prevails during a normal cutting operation, and prevails if, after the second roller has been raised relatively away from the first roller, the at least one displaceable wedge element has been displaced for the purpose of the second roller being once again supported against the wedge device.

10. The rotary cutting device as claimed in claim 1, wherein the wedge device comprises at least one part-device having a first wedge element and a second wedge element, wherein in the support mode the first wedge element is supported against the second wedge element, and wherein at least one of the first wedge element and the second wedge element is displaceable and coupled to the drive device.

11. The rotary cutting device as claimed in claim 10, wherein the first wedge element is associated with the first roller and the second wedge element is associated with the second roller.

12. The rotary cutting device as claimed in claim 10, wherein the first wedge element is connected to the first roller in a manner preventing displacement relative to the first axis of displacement.

13. The rotary cutting device as claimed in claim 10, wherein the first wedge element is arranged on the machine stand in a manner preventing displacement relative to the first axis of displacement.

14. The rotary cutting device as claimed in claim 10, wherein the second wedge element is connected to the second roller in a manner preventing displacement relative to the first axis of displacement.

15. The rotary cutting device as claimed in claim 14, wherein the second wedge element is displaceable with the second roller on the first axis of displacement.

16. The rotary cutting device as claimed in claim 10, wherein the first wedge element is arranged on a first bearing housing of the first roller, by way of which the first roller is seated on the machine stand.

17. The rotary cutting device as claimed in claim 10, wherein the second wedge element is arranged on a second bearing housing by way of which the second roller is seated on the machine stand.

18. The rotary cutting device as claimed in claim 1, wherein the first roller is seated on the machine stand in a manner preventing displacement in relation to the first axis of displacement.

19. The rotary cutting device as claimed in claim 1, wherein the first axis of displacement is oriented transversely to the second axis of displacement.

20. The rotary cutting device as claimed in claim 1, wherein at least one of the first axis of displacement and the second axis of displacement are oriented transversely to an axis of rotation of the first roller.

21. The rotary cutting device as claimed in claim 1, wherein the wedge device has a first part-device and a second part-device, wherein the first part-device and the second part-device are at a spacing from one another in a direction parallel to an axis of rotation of the first roller, and in the support mode the second roller is supported both against the first part-device and against the second part-device.

22. The rotary cutting device as claimed in claim 21, wherein the first part-device and the second part-device take the same form.

23. The rotary cutting device as claimed in claim 21, wherein the drive device has a first drive for the first part-device and a second drive for the second part-device, wherein the first drive and the second drive are synchronized.

24. The rotary cutting device as claimed in claim 1, wherein the drive device is or comprises a mechanical drive or pneumatic drive or hydraulic drive or magnetic drive or inductive drive or electromagnetic drive or motorized drive.

25. The rotary cutting device as claimed in claim 1, wherein the tool roller is a cutting roller or stamping roller or bladed roller or compactor roller or squeezing roller.

26. The rotary cutting device as claimed in claim 1, wherein at least one of the first roller and the second roller are supported by at least one further roller.

27. The rotary cutting device as claimed in claim 1, wherein, during a cutting operation, displaceability of the at least one displaceable wedge element is released and the drive device acts on the at least one displaceable wedge element, and wherein a cutting force is set between the first roller and the second roller by way of the cutting pressure device, wherein the wedge device and the drive device take a form adapted to one another such that during disruption-free operation the second roller is pressed against the first roller, and the initial spacing between the first roller and the second roller is fixed.

28. The rotary cutting device as claimed in claim 27, wherein, when the second roller is raised away from the first roller because of a disruption in a material web, the drive device displaces the at least one displaceable wedge element such that, because support of the second roller against the wedge device is then re-established, the second roller cannot impact against the first roller.

29. The rotary cutting device as claimed in claim 1, having a sensor device that determines a displacement position of the at least one displaceable wedge element and determines the displacement position of the at least one displaceable wedge element in relation to the machine stand.

30. The rotary cutting device as claimed in claim 29, having at least one of a display device and an evaluation device that is coupled to the sensor device in a manner configured to transfer signals.

31. The rotary cutting device as claimed in claim 1, wherein in the event that the at least one displaceable wedge element is automatically displaced, the cutting operation is stopped until the initial spacing between the first roller and the second roller can be reset.

32. A method for operating a rotary cutting device, in which, during a machining operation, a first roller is supported against a second roller, and a material web is guided between the first roller and the second roller, wherein:

(i) the first roller is a tool roller and the second roller is a counter-roller, or (ii) the second roller is a tool roller and the first roller is a counter-roller, and wherein the second roller is displaceable in relation to the first roller on a first displacement axis, in a support mode, the second roller is supported against a wedge device, at least one movable wedge element is displaced such that, when the second roller is raised away from the first roller during the machining operation, the second roller is once again supported against the wedge device, the second roller is then positioned at an initial spacing from the first roller, the at least one displaceable wedge element is displaced automatically such that, when the second roller has been raised away from the first roller during the machining operation, the second roller is prevented from impacting against the first roller because the second roller is supported against the wedge device at an increased fixed spacing which is larger than the initial spacing, and a drive device constantly exerts a biasing force on the at least one displaceable wedge element during the machining operation.

33. The method as claimed in claim 32, wherein the displacement movement of the at least one displaceable wedge element is performed automatically.

34. The method as claimed in claim 32, wherein, during the machining operation, the first roller and the second roller are operated at the same speed of revolution.

35. The method as claimed in claim 32, further comprising:

stopping the machining operation when the at least one displaceable wedge element is automatically displaced; and resetting the initial spacing between the first roller and the second roller before resuming the machining operation.

* * * * *